US007415536B2

(12) United States Patent
Nakazawa

(10) Patent No.: US 7,415,536 B2
(45) Date of Patent: Aug. 19, 2008

(54) ADDRESS QUERY RESPONSE METHOD, PROGRAM, AND APPARATUS, AND ADDRESS NOTIFICATION METHOD, PROGRAM, AND APPARATUS

(75) Inventor: Hiroaki Nakazawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 948 days.

(21) Appl. No.: 10/756,883

(22) Filed: Jan. 13, 2004

(65) Prior Publication Data

US 2004/0143579 A1 Jul. 22, 2004

(30) Foreign Application Priority Data

Jan. 21, 2003 (JP) ............................ 2003-012283

(51) Int. Cl.
*G06F 15/16* (2006.01)
*G06F 7/00* (2006.01)
*H04B 10/08* (2006.01)
*G01R 31/28* (2006.01)

(52) U.S. Cl. ............................ 709/245; 398/9; 398/16; 707/1; 707/2; 707/3; 707/4; 707/5; 707/10; 714/741; 714/742; 714/743; 714/748; 715/734

(58) Field of Classification Search ................. 370/252, 370/254, 389, 395.5, 401, 409, 466; 714/741, 714/742, 743, 748; 707/1-5, 10; 398/9, 398/16; 715/734
See application file for complete search history.

(56) References Cited

U.S. PATENT DOCUMENTS

| | | | | |
|---|---|---|---|---|
| 5,459,837 | A | 10/1995 | Caccavale | |
| 2002/0059622 | A1* | 5/2002 | Grove et al. | 725/91 |
| 2002/0169890 | A1* | 11/2002 | Beaumont et al. | 709/245 |
| 2006/0020688 | A1* | 1/2006 | Chang et al. | 709/219 |

FOREIGN PATENT DOCUMENTS

| | | |
|---|---|---|
| JP | 2002-261794 | 9/2002 |
| WO | 02/39699 | 5/2002 |

OTHER PUBLICATIONS

Partial European Search Report.
Japanese Office Action (with partial English translation) dated Apr. 19, 2005 of basic Japanese Patent Appln. No. 2003-012283.

* cited by examiner

*Primary Examiner*—Ashok Patel
(74) *Attorney, Agent, or Firm*—Morgan & Finnegan LLP

(57) ABSTRACT

Upon reception of a query about the address of a server from a client, a DNS server sends a query about the address of that server to an external DNS server. The DNS server checks based on the address obtained from the external DNS server if connection to the server can be established. If connection to the server cannot be established, and the DNS server receives a query about the address of the server, the DNS server returns a response indicating that the address is not available. When the address is returned before the check process, the DNS sever sets an expiration time shorter than that of the address of the server obtained from the external DNS server as the expiration time of the address of the server.

6 Claims, 10 Drawing Sheets

| | 701 | 702 | 703 | 704 | 705 | 706 |
|---|---|---|---|---|---|---|
| | FQDN | TYPE | ADDRESS | C-TTL | R-TTL | CHECK |
| 711 | www.server.net | AAAA | 2001:340:0:1::1 | 10000 | 10000 | OK |
| 712 | www.server.net | A | 172.16.0.1 | 10000 | 10000 | OK |
| 713 | mail.dual.biz | AAAA | 2001:240::1 | 3000 | 0 | NG |
| | mail.dual.biz | A | 172.20.101.1 | 3000 | 3000 | OK |
| 714 | www.v4only.com | A | 10.10.0.1 | 20000 | 0 | NG |
| 715 | mail.entry.ne.jp | AAAA | 2001:340:10::2 | 60000 | 0 | - |
| | | | | | | |

FIG. 2

| | Domain / FQDN | IPv4 Address | IPv6 Address |
|---|---|---|---|
| USER NW | client.com | 192.168.1.0/24 | 2001:200:1:1::/64 |
| CLIENT | browser.client.com | 192.168.1.10 | 2001:200:1:1::10 |
| DNS SERVER | ns.client.com | 192.168.1.1 | 2001:200:1:1::1 |
| DOMAIN MANAGEMENT NW | server.net | 10.0.0.0/24 | 2001:240::/64 |
| DNS SERVER | ns.server.net | 10.0.0.1 | 2001:240::1 |
| SERVER NW | server.net | 172.16.0.0/24 | 2001:340:1::/64 |
| SERVER | www.server.net | 172.16.0.1 | 2001:340:0:1::1 |

FIG. 5

| | FQDN (701) | TYPE (702) | ADDRESS (703) | C-TTL (704) | R-TTL (705) | CHECK (706) |
|---|---|---|---|---|---|---|
| 711 | www.server.net | AAAA | 2001:340:0:1::1 | 10000 | 10000 | OK |
| 712 | www.server.net | A | 172.16.0.1 | 10000 | 10000 | OK |
| 713 | mail.dual.biz | AAAA | 2001:240::1 | 3000 | 0 | NG |
| | mail.dual.biz | A | 172.20.101.1 | 3000 | 3000 | OK |
| 714 | www.v4only.com | A | 10.10.0.1 | 20000 | 0 | NG |
| 715 | mail.entry.ne.jp | AAAA | 2001:340:10::2 | 60000 | 0 | – |
| | | | | | | |

ADDRESS QUERY RESPONSE METHOD, PROGRAM, AND APPARATUS, AND ADDRESS NOTIFICATION METHOD, PROGRAM, AND APPARATUS

FIELD OF THE INVENTION

The present invention relates to an address query response method, program, and apparatus, and an address notification method, program, and apparatus.

BACKGROUND OF THE INVENTION

In recent years, IPv6 (Internet Protocol version 6) which is the next-generation version of IPv4 (Internet Protocol version 4) as a fundamental protocol that supports the current Internet has begun to be examined.

IPv6 is a technology that replaces IPv4, but does not exclude the IPv4 network used so far, and the transition technology from IPv4 to IPv6 has been examined. The transition technology includes tunnel, translate, and dual technologies.

Of these technologies, the dual technology helps smooth transition of devices and applications used on the network by managing IPv4 and IPv6 on a single network.

Upon using IPv4/IPv6-accessible services such as e-mail, Web, and the like in such dual environment, when a server of a communication partner is designated by an IPv4/IPv6 address, a designated communication protocol is used in a "communication protocol selection procedure" that determines one of the IPv4 and IPv6 communication protocols to be used upon making a communication.

On the other hand, when a server of a communication partner is designated by an FQDN (Fully Qualified Domain Name), one of these communication protocols is determined in the following procedure.

That is,

1. A query about an IPv6 address is sent to a DNS.
2. An IPv6 communication is made if acquisition of the IPv6 address has succeeded.
3. A query about an IPv4 address is sent to the DNS if acquisition of the IPv6 address has failed.
4. An IPv4 communication is made if acquisition of the IPv4 address has succeeded.
5. If acquisition of the IPv4 address has failed, the process is terminated as an error since the designated server is absent.

The above communication protocol selection procedure is made either by parsing the operation contents of various existing applications, or with reference to "Basic Socket Interface Extensions for IPv6" (RFC2133, RFC2553) specified by IETF (The Internet Engineering Task Force).

Note that an IPv4/IPv6-accessible server sets both the IPv4 and IPv6 addresses for one network interface, but often registers only one FQDN as a server name.

That is, if an IPv4/IPv6-accessible Web server "www.server.net" exists, both the IPv4 and IPv6 addresses correspond to this server. In the registration contents to the DNS, two records, i.e., "A" record that sets the IPv4 address and "AAAA" record that sets the IPv6 address are often set for "www.server.net".

Also, most of communication protocols use IPv4 to send a query to a DNS server. For example, as BIND provided by ISC (Internet Software Consortium), BIND4 and BIND8 are used worldwide, but only BIND9 can send a query and response using the IPv6 communication protocol. That is, "AAAA" record can be registered in the DNS, but a query or response cannot be sent using the IPv6 communication protocol.

Also, some OSs install the IPv6 protocol stack. Even such OS or a resolver cannot send any DNS query using the IPv6 communication protocol.

On a network in the dual environment to which clients and server belong, both the IPv4 and IPv6 communications are made on an identical physical line. However, outside that network or outside an ISP which provides that network, IPv4 and IPv6 communications are often made on different lines.

In fact, most of the currently provided IPv6 connection services are implemented tunnel connections.

In the IX (Internet Exchange) of Japan, scarcely any ISPs exchange both IPv4 and IPv6 communication traffics via identical line ports.

Even inside the ISP, an IPv6 backbone is independently built or virtually independent networks are built using the tunnel technology, MPLS, or the like to separately manage IPv4 and IPv6.

In this way, IPv4 and IPv6 communications in the dual environment have equivalent qualities in a single dual network. However, as for communications with an external network, IPv4 and IPv6 communications have quite different bandwidths, convergence levels, and qualities.

Under such circumstance, even when the IPv6 communication is disconnected halfway, a DNS query can be sent to a server as a communication partner using the IPv4 communication protocol. In this case, when that server has "AAAA" record, the IPv6 address can be acquired.

In this manner, when only IPv6 connectivity is lost in a middle network (but IPv4 connectivity is maintained), since the IPv6 address can be acquired, an attempt is made to make a communication using IPv6. However, since a communication with the server cannot be made using IPv6, the IPv4 address is acquired after time-out of several ten seconds, and a communication using IPv4 then starts.

Especially using applications such as a Web browser, e-mail application, and the like that make access frequently, the user may get frustrated since he or she must wait for the end of a time-out time every access.

Upon using IPv6, the dual environment may be recognized as a non-user-friendly environment.

SUMMARY OF THE INVENTION

It is an object of the present invention to avoid a situation in which connection cannot be established even when an address can be acquired.

It is another object of the present invention to prevent a dual environment from being recognized as a non-user-friendly environment.

Other objects of the present invention will be apparent from the following description of the embodiments.

BRIEF DESCRIPTION OF THE DRAWINGS

FIG. 2 is a table showing an example of domain names to which respective networks belong, and FQDNs assigned to respective hosts;

FIG. 5 is a table showing the contents of entry data in cache data of a DNS server;

DETAILED DESCRIPTION OF THE PREFERRED EMBODIMENTS

An embodiment of the present invention will be described in detail hereinafter with reference to the accompanying drawings.

Figure 1:
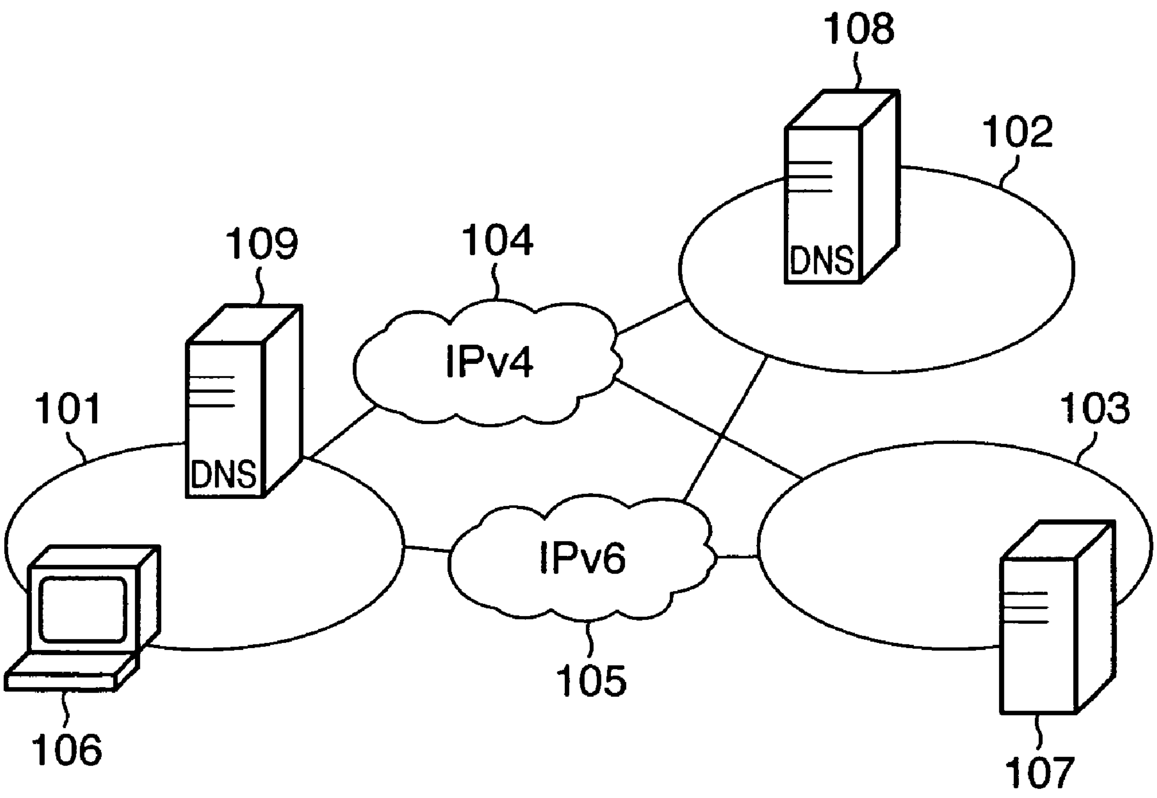
FIG. 1 is a diagram showing the arrangement of a network.

FIG. 1 shows the arrangement of a network according to an embodiment of the present invention.

Referring to FIG. 1, reference numeral 101 denotes a network in an IPv4/IPv6 dual environment to which the user belongs. An IPv4/IPv6-accessible Web client 106 is connected to the user network 101. Also, an IPv4/IPv6-accessible DNS server 109 is connected to the user network 101. The DNS server 109 manages a domain of terminals which belong to the user network 101.

Reference numeral 107 denotes an IPv4/IPv6-accessible Web server, which is connected to a server network 103 in an IPv4/IPv6 dual environment. Reference numeral 108 denotes an IPv4/IPv6-accessible DNS server, which is connected to a domain management network 102 in an IPv4/IPv6 dual environment.

An FQDN is assigned to the Web server 107, and the DNS server 108 manages a domain to which that FQDN belongs.

The user network 101, domain management network 102, and server network 103 can communicate with each other using an IPv4 communication protocol via an IPv4 Internet 104. Also, the user network 101, domain management network 102, and server network 103 can communicate with each other using an IPv6 communication protocol via an IPv6 Internet 105.

FIG. 2 shows an example of the domain names to which the networks explained in FIG. 1 belong, and FQDNs assigned to respective hosts. FIG. 2 also shows an example of IPv4 and IPv6 network addresses assigned to the respective networks, and IPv4 and IPv6 addresses assigned to the respective hosts.

The DNS server 109 which belongs to the user network 101 holds a master zone file used to manage a "client.com" domain. On the other hand, the DNS server 108 which belongs to the domain management network 102 holds a master zone file used to manage a "server.net" domain.

Figure 3:
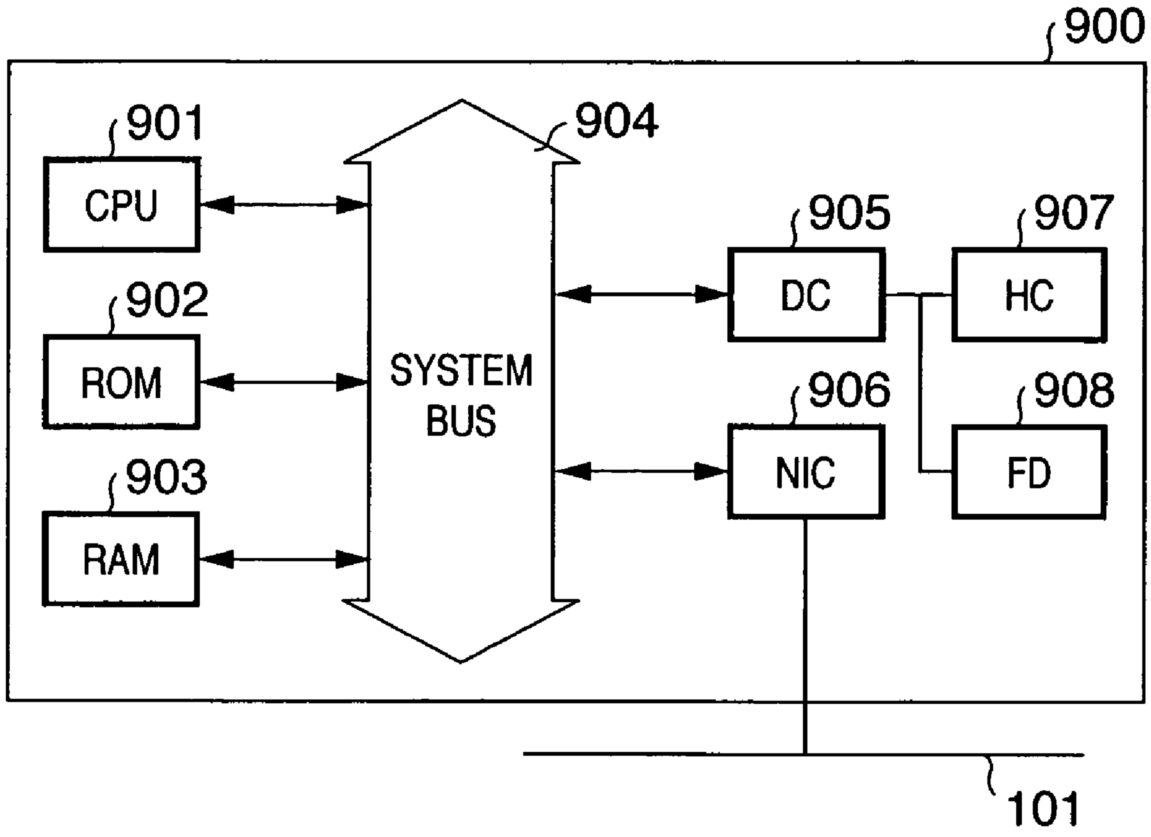
FIG. 3 is a block diagram showing an example of the arrangement that makes a software program, which can implement the functions of this embodiment, run.

FIG. 3 shows an example of the arrangement that makes a software program, which can implement the functions of this embodiment, run.

For example, the DNS server 109 implements the functions of this embodiment by functions of a computer 900 shown in FIG. 3. A computer 900 adopts an arrangement in which a CPU 901, ROM 902, RAM 903, disk controller (DC) 905 of a hard disk (HD) 907 and floppy disk (FD) 908, and network interface card (NIC) 906 are connected via a system bus 904 to communicate with each other. The network interface card 906 connects the network 101 shown in FIG. 1 to the system bus 904.

The DNS server 109 serves as a response apparatus which returns a response message to a query about the address of the server 107 (second apparatus) received from the client 106 (third apparatus). The DNS server 109 also serves as an address notification apparatus which notifies the client 106 (third apparatus) of the address of the server 107 (second apparatus) upon reception of a query about the address of the server 107 (second apparatus) from the client 106 (third apparatus).

The network interface card 906 serves as connection means that connects the network 101.

The CPU 901 serves as generation means for generating a response message to the query about the address of the server 107 (second apparatus) received from the client 106 (third apparatus). The CPU 901 makes a connection test with the server 107 (second apparatus) using the address of the server 107 (second apparatus), and generates a response message corresponding to the connection test result (a response message indicating that the address of the server 107 is not available if the connection test has failed). The CPU 901 also serves as notification means for notifying the client 106 (third apparatus) of the address of the server 107 (second apparatus) upon reception of the query about the address of the server 107 (second apparatus) from the client 106 (third apparatus). The CPU 901 sends a query about the address of the server 107 (second apparatus) to the DNS server 108 in response to the query about the address of the server 107 (second apparatus) from the client 106 (third apparatus), and notifies the client 106 (third apparatus) of the address of the server 107 (second apparatus) and an expiration time shorter than that of the address of the server 107 (second apparatus) obtained from the DNS server 108 (first apparatus) as the expiration time of the address of the server 107 (second apparatus) in response to the query.

The CPU 901 systematically controls the respective units connected to the system bus 904 by executing software stored in the ROM 902 or HD 907 or software supplied from the FD 908. That is, the CPU 901 makes control for implementing the operation of this embodiment by reading out and executing a processing program according to a processing sequence to be described later from the ROM 902, HD 907, or FD 908.

The RAM 903 serves as a main memory, work area, and the like of the CPU 901. The DC 905 controls access to the HD 907 and FD 908, which store a boot program, various applications, edit files, user files, a network management program, the processing program to be described later in this embodiment, and the like. The NIC 906 exchanges data with the server 107 or the like connected to the IPv4 Internet 104 via the network 101 using the IPv4 communication protocol. Also, the NIC 906 exchanges data with the server 107 or the like connected to the IPv6 Internet 105 via the network 101 using the IPv6 communication protocol.

Note that the Web client 106, Web server 107, and DNS server 108 can have the arrangement of the computer 900 shown in FIG. 3 as in the DNS server 109. The Web client 106, Web server 107, and DNS server 108 are respectively connected to the networks 101, 103, and 102 via their NICs 906.

Figure 4:
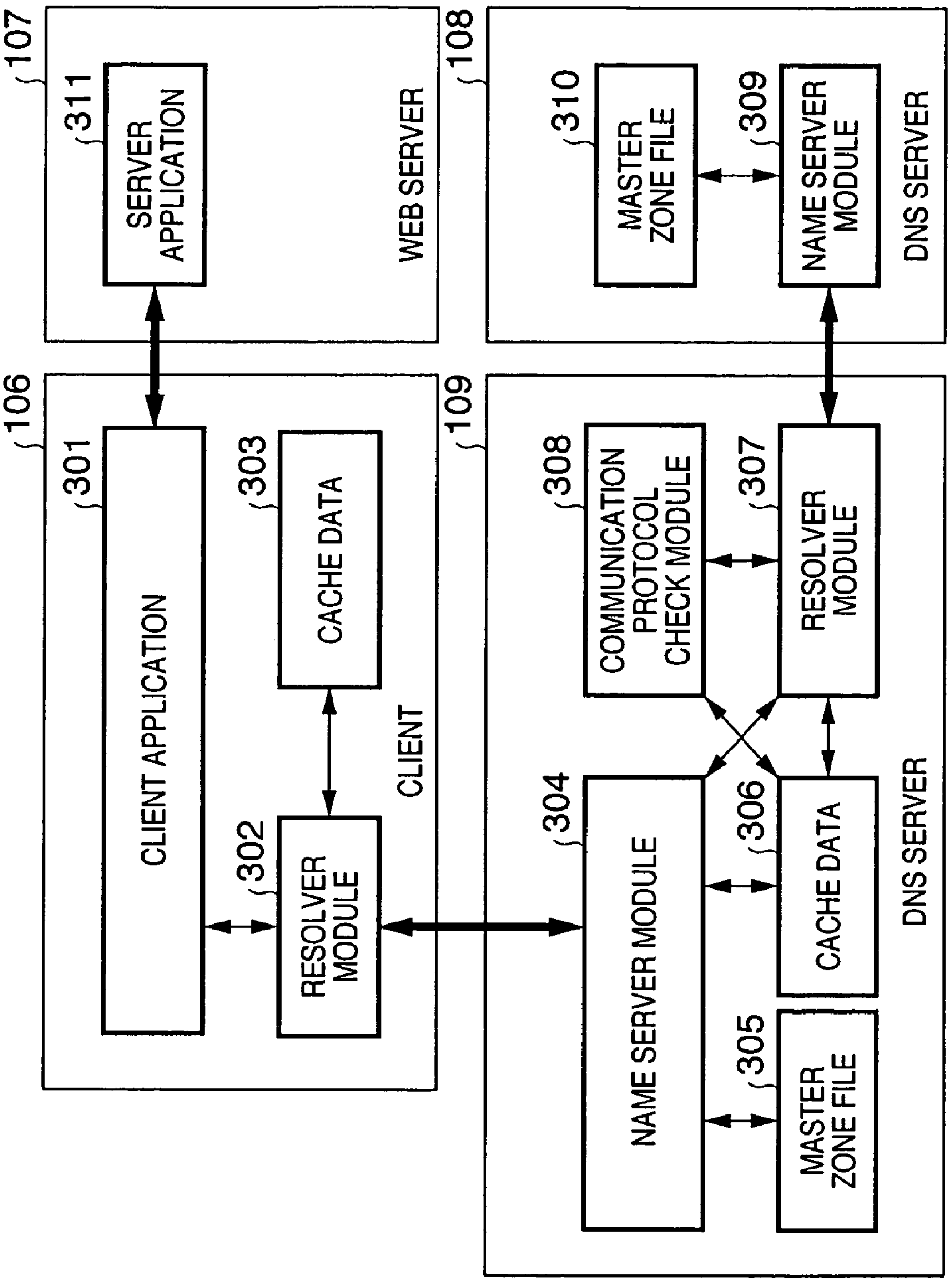
FIG. 4 is a module diagram showing an overview of processes until a communication between a Web client and Web server is established.

FIG. 4 is a module diagram showing an overview of processes until a communication between the Web client 106 and Web server 107 is established.

Reference numerals 301 to 303 denote modules in the Web client 106. Reference numerals 304 to 308 denote modules in the DNS server 109. Reference numerals 309 and 310 denote modules in the DNS server 108. Reference numeral 311 denotes a module in the Web server 107.

Note that the modules 304, 307, and 308 are implemented by software stored in the ROM 902 or HD 907 of the DNS server 109 or software supplied from the FD 908. The CPU 901 implements the functions of the modules 304, 307, and

308 by reading out and executing programs required to implement the modules 304, 307, and 308 from the ROM 902, HD 907, or FD 908.

A master zone file 305 and cache data 306 are stored in the RAM 903, HD 907, or FD 908.

In the Web client 106, the modules 301 and 302 are implemented by software, and cache data 303 is stored in the RAM 903 or HD 907.

Also, in the DNS server 108, the module 309 is implemented by software, and a master zone file 310 is stored in the RAM 903 or HD 907. In the Web server 107, the server application 311 is implemented by software.

The processes until a communication between the Web client 106 and Web server 107 is established will be explained below.

The client application 301 designates a server application as a communication partner. As a designation method, in case of the Web of this embodiment, the server application is designated in the form of a URL "http://www.server.net". The client application 301 extracts an FQDN "www.server.net" as the host name of the server application from this URL, and sends a query about either an IPv4 or IPv6 address corresponding to the designated FQDN to the resolver module 302.

Upon reception of the address query from the FQDN, the resolver module 302 checks if the cache data 303 that records previous query results includes the IPv6 address corresponding to "www.server.net". If the cache data 303 does not include any corresponding IPv6 address, the resolver module 302 also checks the cache data 303 in association with the IPv4 address.

If neither of these addresses are included in the cache data 303, the resolver module 302 sends a query about the IPv4/IPv6 address corresponding to the designated FQDN (to be referred to as a name-lookup query hereinafter) to the DNS server 109.

A communication protocol selected as that used for the name-lookup query is determined depending on a communication protocol used to designate the address of the DNS server, which is set in the OS of the Web client 106. On the other hand, as the name-lookup query sent from the resolver module 302, an "AAAA" DNS Query message (i.e., a name-lookup query about the IPv6 address) is sent first. The communication protocol used to send this message is IPv6 if the address of the DNS server set in the OS of the Web client 106 is the IPv6 address, or IPv4 if it is the IPv4 address.

The sent name-lookup query is received by the name server module 304 in the DNS server 109. The name server module 304 manages the domain "client.com" which belongs to the user network 101, and holds records as pairs of all FQDNs and IPv4/IPv6 addresses which belong to this domain in the master zone file 305. Upon reception of the name-lookup query to an FQDN that belongs to the domain "client.com" to be managed, the name server module 304 extracts and returns information from the master zone file 305.

Upon reception of a name-lookup query associated with another domain which is not managed by the name server module 304, the name server module 304 searches the cache data 306 that records previous name-lookup query results by the DNS server 109. This cache data 306 is internal data of the DNS server 109, and is present independently of the cache data 303 in the Web client 106.

If the cache data 306 includes the corresponding data, the name server module 304 acquires that data from the cache data 306, and checks its active/inactive status. This active/inactive status check process will be described in detail later. Depending on this check result, the name server module 304 returns the IPv6 address of that data to the resolver module 302, thus ending this process. For example, if the check result denies active/inactive status, the name server module 304 returns a message indicating that an address corresponding to the query is not available, even when the cache data 306 includes that address.

On the other hand, if the cache data 306 does not include any corresponding data, i.e., if the cache data 306 does not include the inquired IPv6 address of "www.server.net", the resolver module 307 in the DNS server 109 sends a name-lookup query to an external DNS server so as to relay the received name-lookup query. This resolver module 307 sends the name-lookup query according to an algorithm specified by RFC1034 and RFC1035. That is, queries about domains under a root DNS server, a "net" DNS server, and the "server.net" DNS server 108 are sent in turn. More specifically, when the name server module 304 receives a query about the address of the server 107 (second apparatus) from the client 106 (third apparatus), the resolver module 307 sends a query about the address of the server 107 to the DNS server 108 (first apparatus).

Upon reception of the name-lookup query about "www.server.net", the name server module 309 searches the master zone file 310 for a record of "www.server.net", and extracts the corresponding address.

As described above, in all name-lookup queries, a name-lookup query about the IPv6 address is sent first.

The name server module 309 returns the IPv6 address of "www.server.net" extracted from the master zone file 310 to the resolver module 307 as a DNS Response.

Upon reception of the response from the name server module 309, the resolver module 307 records the received data in the cache data 306. At the same time, the resolver module 307 passes the IPv6 address of "www.server.net" to the communication protocol check module 308 to execute a check process. The communication protocol check module 308 executes the check process (connection test) of the received IPv6 address, and records that result in the cache data 306. The check process (connection test) will be described in detail later.

On the other hand, at the time when it is confirmed that the resolver module 307 has acquired the IPv6 address of "www.server.net" and recorded it in the cache data 306, the name server module 304 acquires that data from the cache data 306, and sends a response to the resolver module 302 as a query source. That is, the name server module 304 notifies the client 106 (third apparatus) of the address of the server 107 (second apparatus) acquired from the DNS server 108 (first apparatus).

Upon reception of the response from the name server module 304, the resolver module 302 checks if the IPv6 address of "www.server.net" can be acquired. If an active IPv6 address can be acquired, the resolver module 302 records that data in the cache data 303, and returns the IPv6 address to the client application 301.

On the other hand, if the response data does not contain any active IPv6 address, the resolver module 302 determines that no IPv6 address is available from "www.server.net" as a communication partner, and transmits a new "A" DNS Query message of "www.server.net" (i.e., a name-lookup query about an IPv4 address) to the name server module 304. The subsequent processing contents are the same as those for the name-lookup query about the IPv6 address. If it is determined as a result of this name-lookup query about the IPv4 address, the resolver module 302 advises the client application 301 accordingly.

In this way, the client application 301 acquires the IPv6 or IPv4 address as a response to the "www.server.net" address query sent to the resolver module 302. The client application 301 specifies the server application 311 of the communication partner using the acquired address, and starts a communication.

The contents of entry data in the cache data 306 of the DNS server 109 will be described below using FIG. 5.

One column in FIG. 5 corresponds to one entry data. Entry data contains some pieces of item information, which respectively include the following information. "FQDN" 701 holds the FQDN of a target host held as cache data.

"Type" 702 indicates a record type defined in that FQDN. Note that the record type is a description in the master zone file of the DNS server. That is, the definition record of the IPv4 address is "A", and that of the IPv6 address is "AAAA". Hence, the same expression is used in the cache data. Since information contained in a name-lookup query has contents that inquire "AAAA" of "www.server.net", the cache data 306 can be searched for the corresponding information by holding the FQDN and record type.

"Address" 703 as the next item holds an IPv4 or IPv6 address. As can be seen from FIG. 5, when the DNS 108 registers both the IPv6 and IPv4 addresses for the FQDN "www.server.net", two entries 711 and 712 are often provided.

When the name server module 309 returns the IPv4/IPv6 address corresponding to the FQDN, it returns address information including a cacheable duration to the inquirer (resolver module 302).

"C-TTL" 704 indicates a value of that cacheable duration, i.e., means a duration in which data can be actually held in the cache data 306. On the other hand, "R-TTL" 705 indicates a value of a cacheable duration as in the aforementioned data "C-TTL" 704. This numerical value indicates a cacheable duration to be contained in a response to a name-lookup query from the resolver module 302.

This embodiment independently manages these data "C-TTL" 704 and "R-TTL" 705, and returns address information with TTL=0 ("R-TTL" 705) to the inquirer (resolver module 302) instead of notifying the inquirer (corresponding to the resolver module 302) of data TLL (cacheable duration "C-TTL" 704) notified from a DNS server (corresponding to the DNS server 108) that manages FQDNs, thus providing an effect of inhibiting the address information from being cached as the cache data (corresponding to the cache data 303) on the inquirer side.

Last data "Check" 706 holds the active/inactive status check result in the communication protocol module 308. As values to be held, "OK" indicates that the corresponding address is active (connection test has succeeded), "NG" indicates that the corresponding address is inactive (connection test has failed), and "-" indicates data before check.

The IPv6 address of "mail.dual.biz" 713 and the IPv4 address of "www.v4only.com" 714 are examples of inactive data held in the cache data since their name-lookup queries to the DNS server have succeeded, but no reachability is found by the address active/inactive status check process.

On the other hand, since "mail.entry.ne.jp" 715 is new data recorded from the resolver module 307 in the cache data 306, its active/inactive status check process is not done yet. At this time, since the name server module 304 must quickly return acquired address information to the resolver module 302, it returns address information in response to the first name-lookup query without waiting for the address active check result. However, if the returned address is inactive, a time-out problem will occur upon next connection when the cache data 303 on the client side holds that address information. Hence, the value "R-TTL" is set to be "0" to return address information with TTL=0.

The flow to be processed by the name server module 304 of the DNS server 109 will be described below using FIG. 6. This flow indicates some of programs stored in the ROM 902 or HD 907 of the DNS server 109 or those supplied from the FD 908. The CPU 901 implements the following process by reading out and executing a program required to implement the module 304 from the ROM 902, HD 907, or FD 908.

Step 401 is a loop that waits for a name-lookup query associated with a domain other than that managed by the name server module 304. This name-lookup query from the resolver module 302 is received by the NIC 906. If the CPU 901 receives a name-lookup query about "www.server.net" from the resolver module 302, the flow advances to step 402. In this case, the process similarly functions independently of the name-lookup query about the IPv6 address or that about the IPv4 address.

Upon reception of a name-lookup query to the FQDN that belongs to the domain "client.com" managed by the name server module 304, the module 304 extracts and returns information from the master zone file 305.

It is searched in step 402 if the IPv4/IPv6 address (one inquired by the resolver module 302) corresponding to the FQDN in the query is available. The search result is determined in step 403. If the corresponding data (the IPv4 or IPv6 address of www.server.net) is found, the flow advances to step 407; otherwise, the flow advances to step 404.

In step 404, the name server module 304 transmits the query contents to the resolver module 307 and requests it to send the received name-lookup query about "www.server.net" to an external DNS server. The resolver module 307 is a processing module, which is also implemented by reading out and executing a program from the ROM 902, HD 907, or FD 908 by the CPU 901.

The resolver module 307 resolves the IPv4/IPv6 address of "www.server.net", as described above, and the name server module 304 acquires that result via the cache data 306. As for this query request, the name-lookup query about the IPv4 or IPv6 address has the same contents (the name-lookup query about the IPv4 or IPv6 address) as that received in step 401.

The CPU 901 executes the process of the name server module 304, and starts the process of the resolver module 307 in step 404. After the processing result of the resolver module 307 is obtained, the CPU 901 restarts the process of the name server module 304.

The name server module 304 checks the result obtained via the cache data 306 in step 405. If the IPv4/IPv6 address can be acquired in response to the name-lookup query in step 405, the flow advances to step 407; otherwise, the flow advances to step 406. If the corresponding IPv4/IPv6 address cannot be acquired, the name server module 304 transmits the same response message (Response (nothing) message or Error message) as the result obtained by the resolver module 307 to the resolver module 302 in step 406, and the flow returns to the reception wait loop in step 401.

On the other hand, if it is determined in step 405 that the corresponding IPv4/IPv6 address can be acquired, and if it is determined in step 403 that the IPv4/IPv6 address can be acquired by searching the cache data 904, the active/inactive status of that address is checked in step 407. The address active/inactive status check process is executed by the communication protocol check module 308, and its result 706 is recorded in the corresponding entry of the cache data 306, as shown in FIG. 5. The name server module 304 extracts that check result and determines it in step 408. In step 408, the name server module 304 refers to the "Check" item 706 in the corresponding entry of the cache data 306. If this item is "OK", the module 304 determines an active address (the connection test has succeeded); if it is "NG", the module 304 determines an inactive address (the connection test has failed).

Note that this item 706 includes "-". This value indicates data before the check process of the communication protocol check module 308, and appears upon sending the query request to the resolver in step 404. In case of this data before the check process, an active address is determined. When the "Check" item 706 is "-", the value "R-TTL" 705 is set to be "0" (or a sufficiently small value (1, 2, or the like)) so as to inhibit the resolver module 302 of the client 106 from storing the address before the check process and re-using that address.

If the name-lookup query to "www.server.net" received in step 401 is to acquire the IPv6 address, the name server module 304 extracts an active IPv6 address from the cache data 306 and returns it as a Response AAAA message to the resolver module 302 in step 409. In this case, the value of the "R-TTL" item 705 in the cache data 306 is substituted in a TTL value (a duration in which the cache data 303 can cache this IPv6 address) in the message to be transmitted.

If the name-lookup query to "www.server.net" received in step 401 is to acquire the IPv4 address, the name server module 304 extracts an active IPv4 address from the cache data 306 and returns it as a Response A message to the resolver module 302 in step 411. In this case, the value of the "R-TTL" item 705 in the cache data 306 is substituted in a TTL value in the message to be transmitted.

If it is determined in step 408 that the address is inactive, the name server module 304 transmits a Response (nothing) message to the resolver module 302 in step 410. Upon completion of the processes in steps 409 to 411, the flow returns to the reception wait loop in step 401.

The processing flow of the resolver module 307 of the DNS server 109 will be described below using FIG. 7. This flow indicates some of programs stored in the ROM 902 or HD 907 of the DNS server 109 or those supplied from the FD 908. The CPU 901 implements the following process by reading out and executing a program required to implement the module 307 from the ROM 902, HD 907, or FD 908.

If no corresponding cache data is found in the process of the name server module 304 in step 403, the CPU 901 executes the process of the resolver module 307 in step 404. That is, if the cache data 306 does not include any data corresponding to the name-lookup query received by the name server 304, the resolver module 307 accepts a name-lookup query request from the name server module 304 in step 501. The contents of the name-lookup query that the name server module 304 entrusts to the resolver module 307 are the same as those of the name-lookup query about the IPv4/IPv6 address of "www.server.net" that the resolver module 302 inquires the name server module 304.

In step 502, the name-lookup query with the contents accepted in step 501 is executed to an external DNS server. The name-lookup query is executed in step 502 in accordance with the algorithm specified by RFC1034 and RFC1035, as described above. That is, queries about domains under a root DNS server, a "net" DNS server, and the "server.net" DNS server 108 are sent in turn.

A communication protocol used in the name-lookup query to "www.server.net" to be transmitted to the DNS server 108 as the management server of the "server.net" domain is determined by the address of the DNS server 107 notified by a "net" domain management server as a host DNS server. When a DNS server that manages the "net" domain does not accept registration of any record based on an IPv6 address, the IPv4 protocol is used in a communication between the resolver module 307 and name server module 309.

In step 503, a response to the query is received from the external DNS server 108. In step 504, the contents of the response to the query received in step 503 are checked, and the flow branches to steps 505 to 508 depending on the check result.

Step 505 corresponds to a case wherein the name-lookup query about the IPv6 address of "www.server.net" has succeeded, and a Response AAAA message that contains IPv6 address information is received. Step 508 corresponds to a case wherein the name-lookup query about the IPv4 address of "www.server.net" has succeeded, and a Response A message that contains IPv4 address information is received. Both steps 505 and 508 correspond to the case wherein the name-lookup query has succeeded in step 502, and the flow advances from these steps to step 510.

On the other hand, step 506 corresponds to a case wherein no record having address information corresponding to the name-lookup query about the IPv6 or IPv4 address of "www.server.net" is found, and a Response (nothing) message that contains no address information is received. Step 507 corresponds to a case wherein any error has occurred in response to the name-lookup query about the IPv6 or IPv4 address of "www.server.net" (e.g., the external DNS server cannot understand the record type in the query, a target external DNS server is not found, and so forth), and an Error message is received. Both steps 506 and 507 correspond to the case wherein the name-lookup query has failed in step 502. In either of steps 506 and 507, the resolver module 307 returns the response contents (Response (nothing) message or Error message) to the name server module 304 in step 509, and notifies the name server module 304 of the end of the entrusted name-lookup query, thus ending the process. The CPU 901 then executes the process of the name server module 304 in step 405. In this case, the name server module 304 returns acquisition failure to the resolver module 302 in step 406.

If the name-lookup query has succeeded, the resolver module 307 generates contents to be recorded in the cache data 306 in step 510. The respective pieces of item information are as described above with reference to FIG. 5.

More specifically, the data to be generated in this step contains item information of the check determination result 706 and R-TTL (an actual cacheable duration to the client) 705 in addition to standard item information of the DNS cache data such as the FQDN "www.server.net" 701, its IPv4/IPv6 address 703, record type ("A" (IPv4) or "AAAA" (IPv6)) 702, and C-TTL (a cacheable duration notified by the external DNS server 108) 704. Upon generation of data in step 510, "-" (data before check) is substituted in the check determination result item, and "0" is substituted in the actual TTL (R-TTL) value 705. Note that the actual TTL (R-TTL) value is not limited to "0", but no problem is posed if it is set to be "1", "2", or "3".

That is, when the name server module 304 receives a name-lookup query (401), the resolver module 307 transmits a query to the external DNS server 108 (502). The resolver module 307 receives a response from the external DNS server 108 (503), and sets the R-TTL value 705 to be a duration shorter than the cacheable duration (the expiration time of the address received in step 503) contained in the response received in step 503 (510). The name server module 304 returns this R-TTL value 705 to the sender of the name-lookup query as the cacheable duration (the expiration time)

of the address together with the address contained in the response received from the external DNS server 108 in step 503 (409, 411).

In step 511, the resolver module 307 records the data generated in step 510 in the cache data 306, and notifies the name server module 304 of the end of the entrusted name-lookup query. After that, the CPU 901 executes the process of the name server module 304 in step 405. The resolver module 307 transmits the data recorded in step 511 to the communication protocol check module 308 in step 512 so as to check (conduct a connection test) if the IPv4/IPv6 address recorded in the cache data 306 is active, thus requesting the module 308 to execute the address check process, and ending all the processes.

The processing flow in the communication protocol check module 308 of the DNS server 109 will be described below with reference to FIG. 8. This flow indicates some of programs stored in the ROM 902 or HD 907 of the DNS server 109 or those supplied from the FD 908. The CPU 901 implements the following process by reading out and executing a program required to implement the module 308 from the ROM 902, HD 907, or FD 908.

This communication protocol check process is launched at two timings. As one timing, this process is launched when the IPv4/IPv6 address is notified from the resolver module 307. This event is generated when new address information is recorded in the cache data 306, and the active/inactive status of that IPv4/IPv6 address must be checked.

As the other timing, this process is launched when a predetermined period of time (e.g., 5 minutes) has elapsed. This is to periodically check the active/inactive status of the IPv4/IPv6 addresses recorded in the cache data 306 to make evaluation suited to ever-changing network information.

It is checked in step 601 at which of the above two timings this process is to be launched (in response to a check request from the resolver module 307 or to make a periodic check process after an elapse of the predetermined period of time). Upon reception of the IPv4/IPv6 address from the resolver module 307, i.e., if the CPU 901 acquires an active IPv4/IPv6 address from an external server in the process of the resolver module 307 and ends the process of the resolver module 307, the CPU 901 executes the active/inactive status check process of that address in step 602.

The active/inactive status check process of the address (e.g., that of the Web server 107) in this embodiment confirms connectivity of the IPv4/IPv6 address in respective communication protocols from the DNS server 109 to the Web server 107 (to conduct a connection test), thus checking the active/inactive status of the address. To this end, the communication protocol check module 308 transmits a predetermined message to the IPv4/IPv6 address which is to undergo connectivity check using respective communication protocols, checks responses to that message, and confirms the active/inactive status of the address based on the check results. This check process will be described in detail later in steps 611 to 616.

In the data that has undergone the address active/inactive status check process in step 602, the contents of the "Check" field 706 and "R-TTL" field 705 of entry data that has already been recorded in the cache data 306 are corrected by overwrite in step 603, and the flow returns to step 601.

On the other hand, if the process is launched after an elapse of the predetermined period of time (e.g., 5 minutes), the flow advances to step 604. In step 604, the communication protocol check module 308 acquires each entry data recorded in the cache data 306. The module 308 extracts the IPv4/IPv6 address from the entry data acquired in step 605, and executes the address active/inactive status check process (connection test) in step 606. The check process in step 606 is executed in the same manner as that in step 602. If the record type 702 of the address 703 acquired from the cache data 306 is "AAAA", the connection test of that address is conducted using IPv6. On the other hand, if the record type 702 is "A", the connection test of that address is conducted using IPv4. In step 608, the module 308 reflects the check process result in step 606 in the cache data 306 as in step 603. The processes in steps 604, 605, and 606 are repeated for respective entries stored in the cache data 306, i.e., the connection tests of respective addresses stored in the cache data 306 are conducted, and the test results are stored in the corresponding "Check" fields 706.

Figure 9:
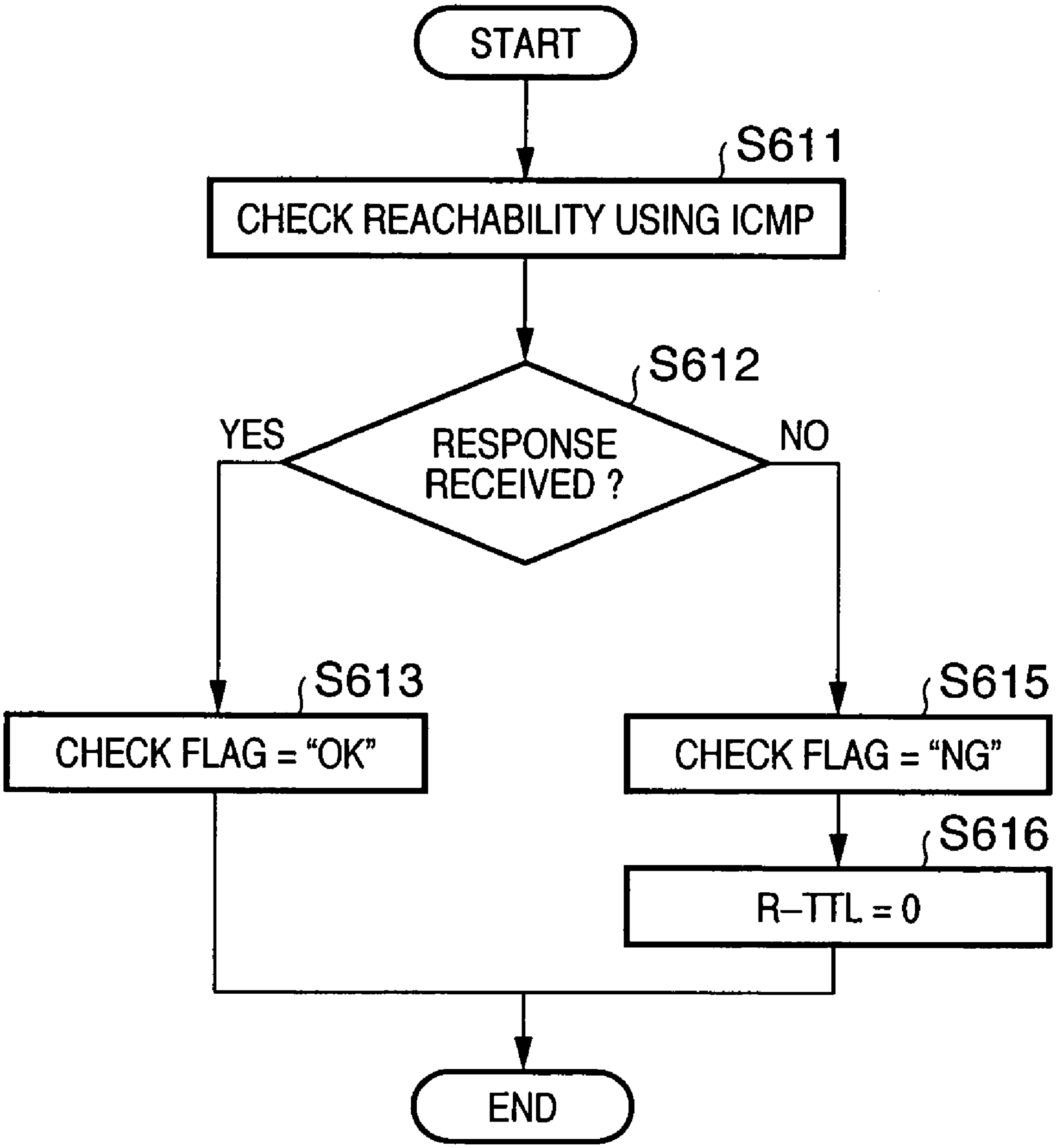
FIG. 9 is a flow chart of an address active/inactive status check (connection test) process.

Subsequently, the processing flow of the address active/inactive status check process (connection test) executed in steps 602 and 606 will be described below with reference to FIG. 9.

The address active/inactive status check process in this embodiment confirms connectivity of the IPv4/IPv6 address in respective communication protocols from the DNS server 109 to the Web server 107 (to conduct a connection test), thus checking the active/inactive status of the address.

That is, the communication protocol check module 308 transmits a predetermined message to the IPv4/IPv6 address which is to undergo connectivity check using respective communication protocols, checks responses to that message, and confirms the active/inactive status of the address based on the check results.

In this embodiment, as a message used to check the active/inactive status of the address (to test connectivity), an ICMP echo message is used. That is, the communication protocol check module 308 transmits the ICMP echo message used for connectivity check to the IPv4/IPv6 address to be checked using respective communication protocols. That is, in order to check the IPv6 address, the ICMP echo message is transmitted using the IPv6 communication protocol. In order to check the IPv4 address, the ICMP echo message is transmitted using the IPv4 communication protocol.

The module 308 checks in step 612 if a response to the ICMP echo issued in step 602 or 606 is received. If a response is received within a predetermined period of time (e.g., within 1 second), the module 308 determines that the address is active, and substitutes "OK" in the check determination result field 706 as an item in the entry data to be recorded in the cache data 306 in step 613.

On the other hand, if no response to the ICMP echo is received within the predetermined period of time (e.g., 1 second), the module 308 determines that the address is inactive, and substitutes "NG" in the check determination result field 706 as an item in the entry data to be recorded in the cache data 306 in step 615. Subsequently, the module 308 sets "0" in the R-TTL (actual cacheable duration to the client) value 705 in the entry data in step 616, thus ending the check process.

If a message indicating that the ICMP echo message cannot reach the destination is received from a server on the Internet 104 or 105 within the predetermined period of time (e.g., 1 second), the module 308 also substitutes "NG" in the check determination result field and sets "0" in the R-TTL value. If the check determination result field is "NG", the R-TTL value need not be set to be "0" since a Response (nothing) message is returned to the client.

The entry data generated in steps 613, 614, 615, and 616 is stored in the cache data 306 in step 603 or 608. Note that the module 308 transmits a predetermined message to the IPv4 and IPv6 addresses recorded in the cache data 306 using respective communication protocols in step 606. If a response to the message from each address is received in step 612, the module 308 executes the process in step 613; if no response is received within the predetermined period of time, the module 308 executes the processes in steps 615 and 616.

Note that the wait time of a response to the message transmitted to check the active/inactive status of the address is not limited to 1 second, but may be set to be, e.g., 30 seconds.

In another embodiment, the address active/inactive status check processes in steps 602 and 606 use different times as the response wait time. For example, the address active/inactive status check process in step 602 determines the address active/inactive status after waiting for a response to the message for 30 seconds, and that in step 606 determines the address active/inactive status after waiting for a response to the message for 1 second.

Note that the DNS cache data is not allowed to be cached for the time beyond the TTL value. For this reason, the value of the cacheable duration C-TTL (cacheable duration notified from the external DNS server) 704 is decremented by 1 every seconds to check the C-TTL value 704, and the expired entry is deleted from the cache data 306 (to inactivate the address stored in the cache data 306 in accordance with its expiration time). Note that the R-TTL (actual cacheable duration to the client) value 705 is decremented by 1 unless it is “0”.

Figure 8:
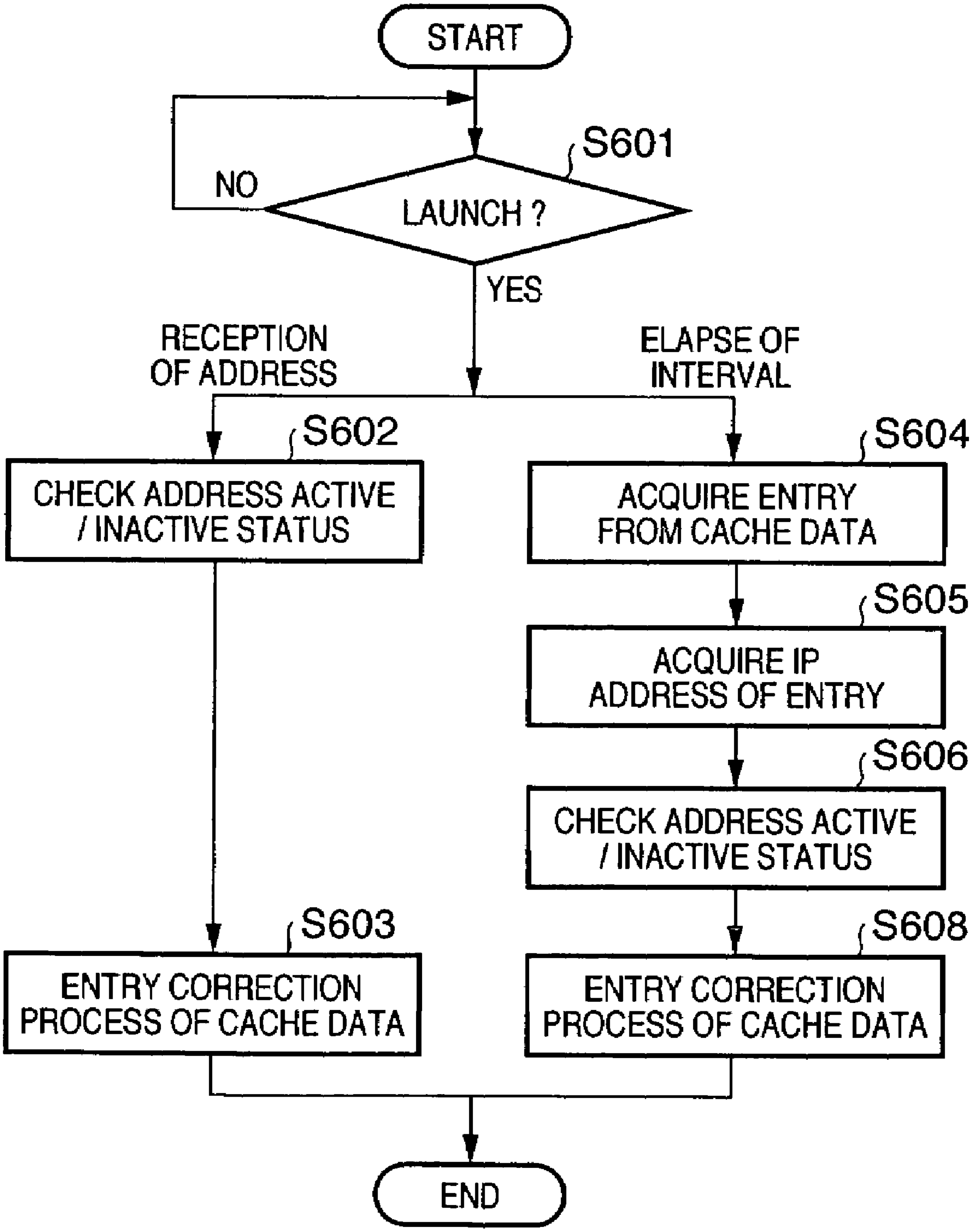
FIG. 8 is a flow chart showing the process of a communication protocol check module of the DNS server.

As shown in steps 604 to 608 in FIG. 8, the communication protocol check module 308 repeats a connection test for the addresses within the expiration time stored in the cache data 306, and registers the test results in the corresponding Check fields 706. The name server module 304 returns a message corresponding to the latest connection test result repeated by the communication protocol check module 308 (409, 41, 411).

Figure 10:
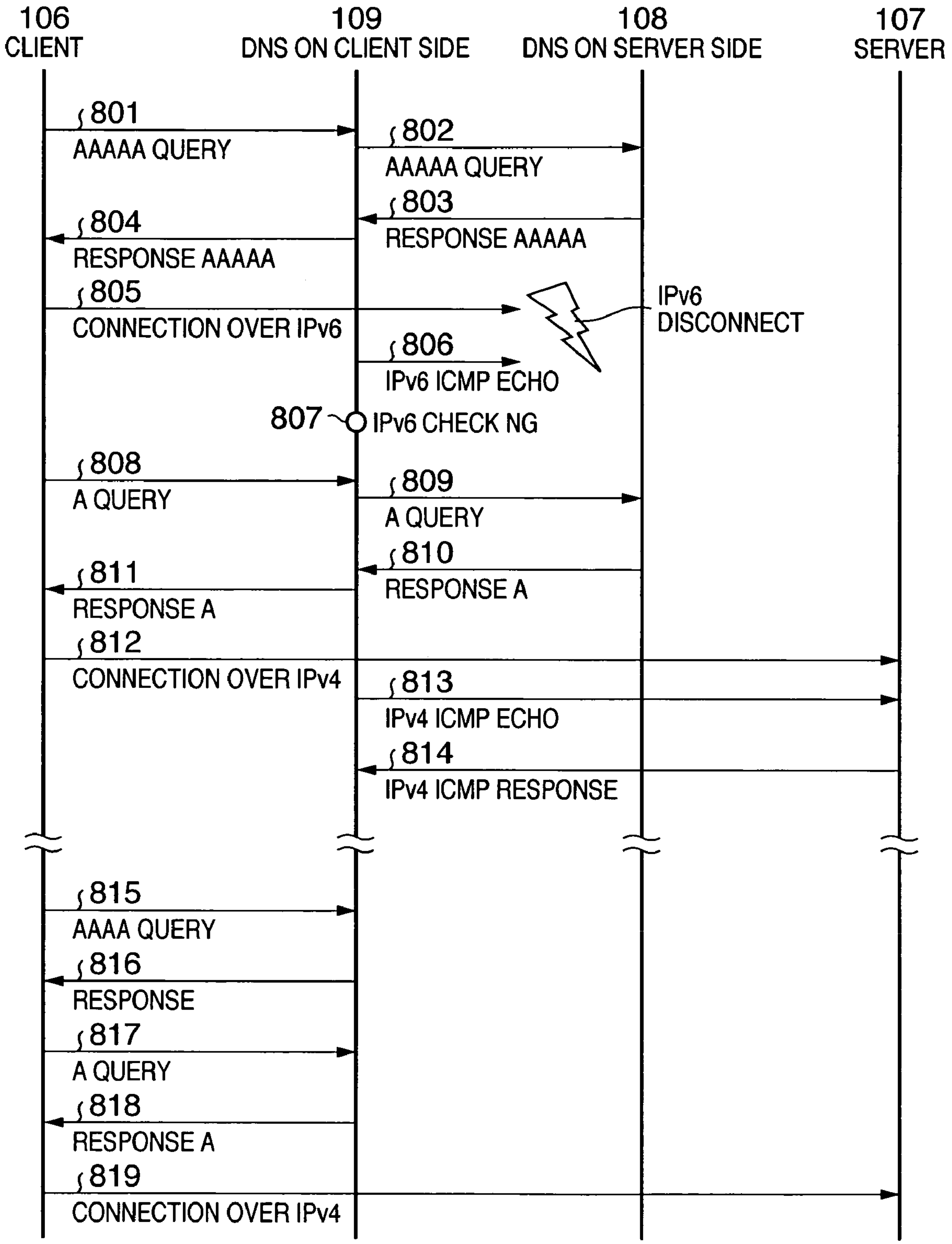
FIG. 10 is a chart showing the contents of communication packets and their flow when they cannot be reached using the IPv6 communication protocol.

FIG. 10 is a chart showing the contents of communication packets and their flow when they cannot be reached from the Web client 106 to the Web server 107 using the IPv6 communication protocol.

In the subsequent flow, the operation of the DNS server 109 is implemented by the modules 304, 307, and 308 as software stored in the ROM 902 or HD 907 of the DNS server 109 or software supplied from the FD 908.

FIGS. 6, 7, 8, and 9 implement, by their collaboration, a response program to a query about an address, which comprises a reception step (503) of receiving the address of the Web client 107 (second apparatus) from the DNS server 108 (first apparatus), a test step (606) of conducting a connection test with the Web server 107 (second apparatus(using the address of the Web server 107 (second apparatus), and a response step (410) of returning a message according to the connection test result in the test step (606) (a message indicating that the address of the Web server 107 (second apparatus) is not available if the connection test in the test step has failed) in response to a query about the address of the Web server 107 (second apparatus) from the Web client 106 (third apparatus).

Also, FIGS. 6, 7, 8, and 9 implement, by their collaboration, an address notification program comprising steps of: sending a query about the address of the Web server 107 (second apparatus) (502) to the DNS server 108 (first apparatus) in response to a query about the address of the Web server 107 (second apparatus) received from the Web client 106 (third apparatus) (401), and notifying the Web client 106 (third apparatus) of an expiration time shorter than that of the address of the Web server 107 (second apparatus) obtained from the DNS server 108 as an expiration time of the address of the Web server 107 (second apparatus) together with the address of the Web server 107 (second apparatus) in response to the query (502).

The Web client 106 transmits a name-lookup query (query about “AAAA” to “www.server.net”), i.e., an AAAA Query 801, to the nearby DNS server 109.

Upon reception of this name-lookup query 801 (401 in FIG. 6), the DNS server 109 searches its own cache data 306 (402). Since no corresponding data is found (No in 403 in FIG. 6), the DNS server 109 sends a name-lookup query (query about “AAAA” to “www.server.net”), i.e., an AAAA Query 802, to the DNS server 108 that manages the target FQDN (404 in FIG. 6, 501 and 502 in FIG. 7). That is, upon reception of the query about the address of the server 107 (second apparatus) from the client 106 (third apparatus), the DNS server 109 sends a query about the address of the server 107 to the DNS server (first apparatus).

In response to the query 802, the DNS server 108 transmits a response (“AAAA” of “www.server.net”=“2001:340:0:1::1”, “TTL=10000”) to the query that contains an IPv6 address corresponding to the FQDN in the query, i.e., a Response AAAA 803, to the DNS server 109.

Figure 6:
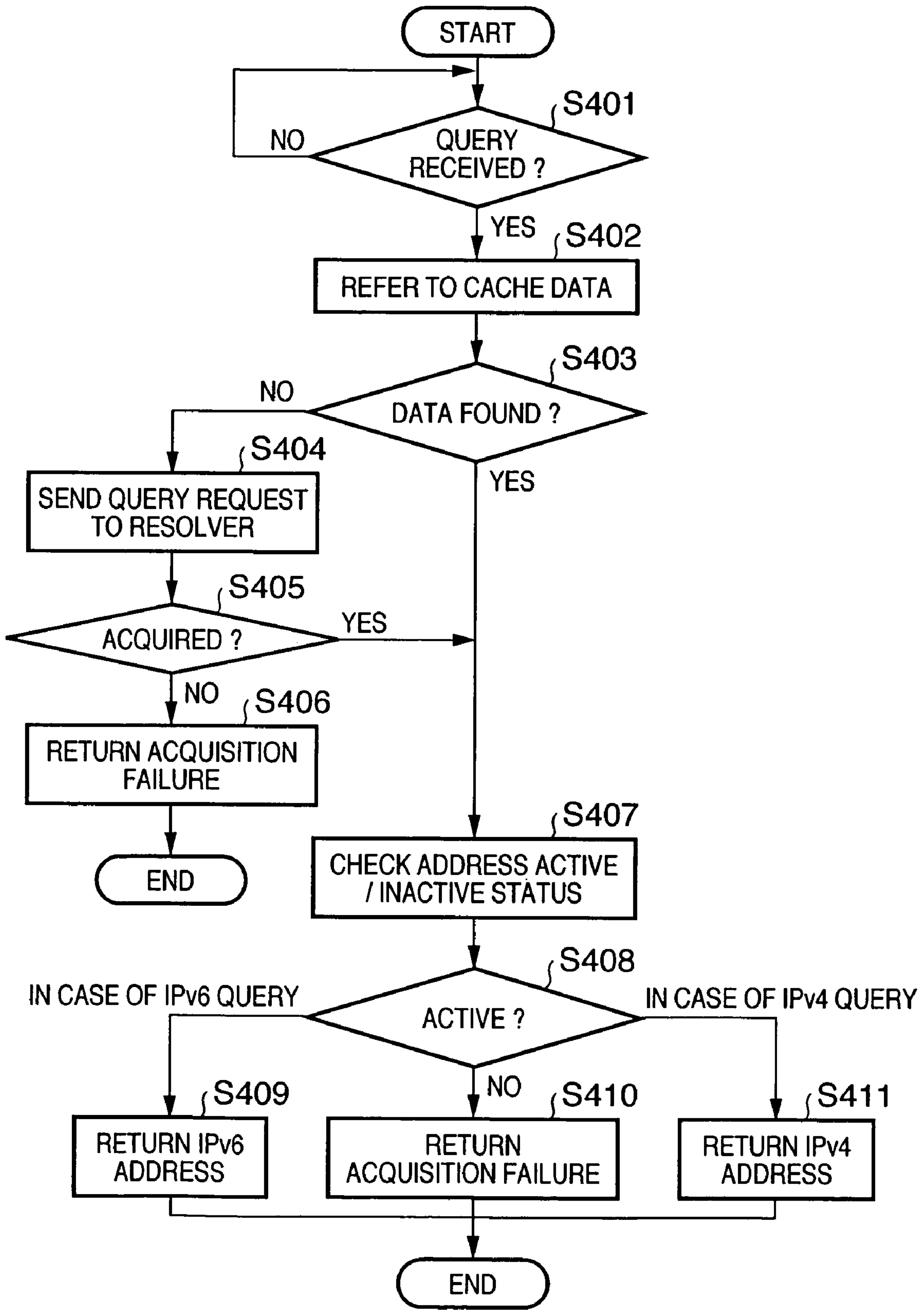
FIG. 6 is a flow chart showing the process of a name server module of the DNS server.

The DNS server 109 receives this response 803 (503, 504, 505, 510, and 511 in FIG. 7), and quickly transmits a response (“AAAA” of “www.server.net”=“2001:340:0:1::1”, “TTL=0”) to the query, i.e., a Response AAAA 804, to the Web client 106 (Yes in 405, 407, 408, and 409 in FIG. 6). That is, the DNS server 109 notifies the client 106 of the address of the server 107 obtained from the DNS server 108. The DNS server 109 notifies the client 106 of the expiration time “R-TTL” 705 (its value is, e.g., “0”) shorter than the expiration time “C-TTL” 704 of the address of the server 107 obtained from the DNS server 108 as the expiration time of the address of the server 107 (see 510 and 511 in FIG. 7).

Since the Web client that has received the response 804 acquires the IPv6 address “2001:340:0:1::1” of “www.server.net”, it attempts to establish connection 805 to the target server 107 using the IPv6 communication protocol. However, the client cannot establish that connection since the network is disconnected halfway.

Figure 7:
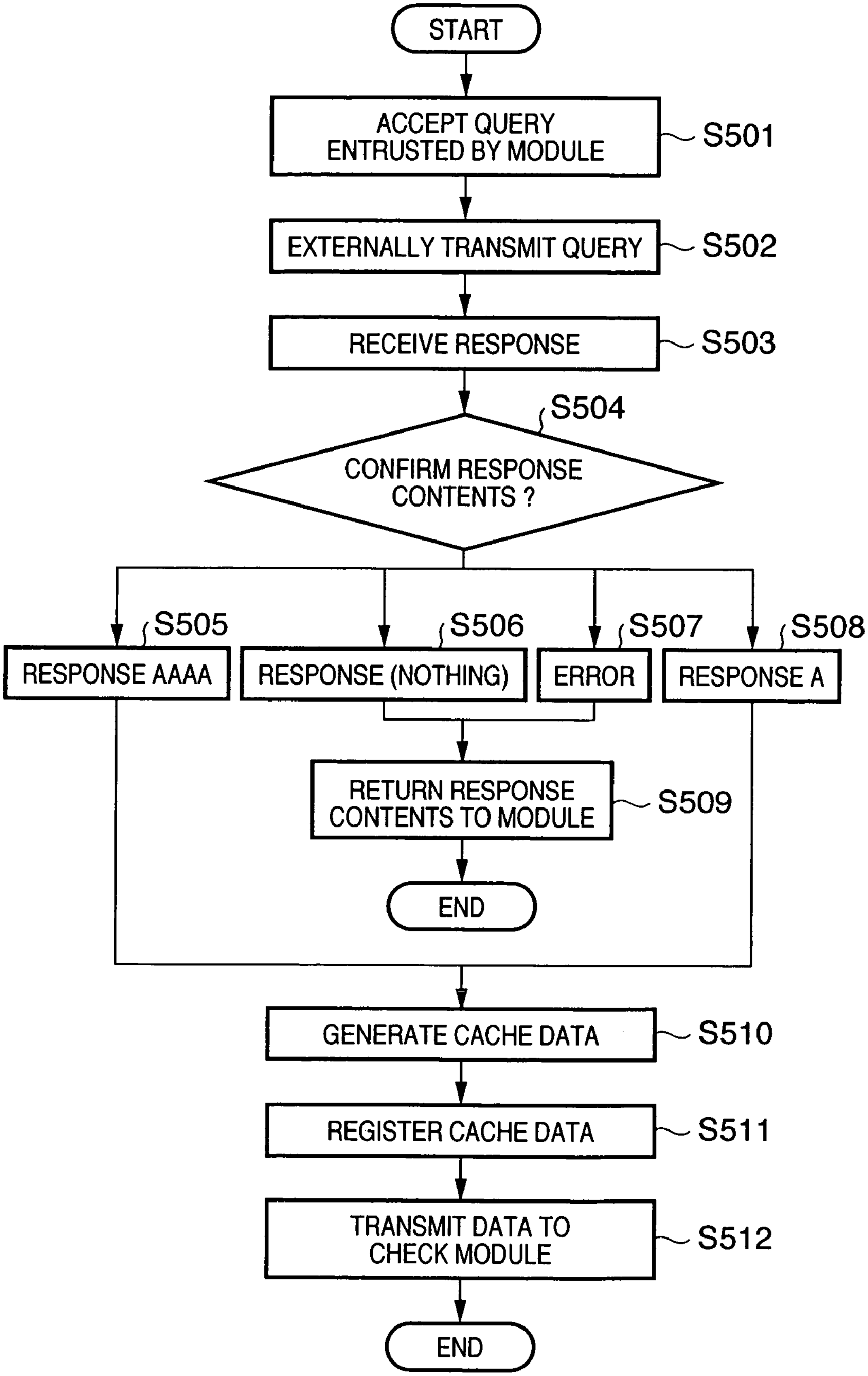
FIG. 7 is a flow chart showing the process of a resolver module of the DNS server.

On the other hand, the DNS server 109 transmits an ICMP echo message 806 to the target address “2001:340:0:1::1” to check the active/inactive status of the IPv6 address at substantially the same timing as the IPv6 address message (Response AAAA) 804 (512 in FIG. 7, 601 and 602 in FIG. 8). Since the message 806 does not reach the Web server 107, neither (No in 612 in FIG. 9), an address active/inactive status check process 807 determines NG (the connection test has failed) (615). This IPv6 address connectivity test is conducted using the IPv6 communication protocol.

The Web client waits for the end of a time-out time from connection 805 to a failure of communication establishment, and sends a name-lookup query (query about “A” to “www.server.net”), i.e., an A Query 808, to the nearby DNS server 109 so as to acquire the IPv4 address after the end of the time-out time.

Upon reception of this name-lookup query 801 (401 in FIG. 6), the DNS server 109 searches its own cache data 306 (402). Since no corresponding data is found (No in 403 in FIG. 6), the DNS server 109 sends a name-lookup query (query about “A” to “www.server.net”), i.e., an A Query 809, to the DNS server 108 that manages the target FQDN (404 in FIG. 6, 501 and 502 in FIG. 7).

In response to the query 809, the DNS server 108 transmits a response (“A” of “www.server.net”=“172.16.0.1”, “TTL=10000”) to the query that contains an IPv4 address corresponding to the FQDN in the query, i.e., a Response A 810, to the DNS server 109.

The DNS server 109 receives this response 810 (503, 504, 505, 510, and 511 in FIG. 7), and quickly transmits a response ("A" of "www.server.net"="172.16.0.1", "TTL=0") to the query, i.e., a Response A 811, to the Web client 106 (Yes in 405, 407, 408, and 411 in FIG. 6).

Since the Web client that has received the response 811 acquires the IPv4 address "172.16.0.1" of "www.server.net", it attempts to establish connection 812 to the target server 107 using the IPv4 communication protocol. Since this connection 812 is established, the Web client 106 receives data from the Web server 107.

On the other hand, the DNS server 109 transmits an ICMP echo message 813 to the target address "172.16.0.1" to check the active/inactive status of the IPv4 address at substantially the same timing as the IPv4 address message (Response A) 811 (512 in FIG. 7, 601 and 602 in FIG. 8). Since a response to the message 813 is transmitted from the Web server 107 as an ICMP Response 814 (Yes in 612 in FIG. 9), an address active/inactive status check process determines OK (the connection test has succeeded). Note that this IPv4 address connectivity test is conducted using the IPv4 communication protocol.

After that, when a new connection request to the Web server 107 is generated (for example, when the user selects a link on a Web page to acquire another data in the identical Web server), the Web client 106 transmits a name-lookup query (query about "AAAA" to "www.server.net"), i.e., an AAAA Query 815, to the nearby DNS server 109 again. Note that the IPv4 address "172.16.0.1" of "www.server.net" notified by the response 811 is not stored in the cache data 303 of the Web client 106 since its "TTL" value is "0".

Upon reception of this name-lookup query 815 (401 in FIG. 6), the DNS server 109 searches its own cache data 306 (402). Since the server 109 detects based on the cache data that has undergone the address active/inactive status check process 807 in FIG. 10 that the IPv6 address check result is "NG" (Yes in 403, 407, No in 408 in FIG. 6), it transmits a no-address message ("AAAA" of "www.server.net" is not available), i.e., a Response (nothing) 816, as a response to the Web client 106 (410 in FIG. 6). That is, the DNS server 109 receives the IPv6 address of the server 107 from the DNS server 108 (first apparatus) in response to the first query 801 about the IPv6 address of the server 107 (second apparatus), conducts a connection test (806, 807) with the server 107 using the address of the server 107 (second apparatus), and returns a message 816 corresponding to the connection test result (806, 807) (a message indicating that no address of the server 107 is available if that connection test has failed) in response to the second query 815 about the IPv6 address of the server 107 (second apparatus).

Upon reception of this response 816, the Web client 106 then transmits a name-lookup query about the IPv4 address, i.e., an A Query 817. The DNS server 109 similarly receives this name-lookup query (401 in FIG. 6), searches its own cache data 306 (402), and extracts the IPv4 address from the cache data that has undergone the address active/inactive status check process. After the DNS server 109 confirms that the check result is "OK" (Yes in 403, 407, and 408 in FIG. 6), it transmits a query response ("A" of "www.server.net"="172.16.0.1", "TTL=10000"), i.e., a Response A 818 (411).

Since the Web client 106 can successfully acquire the IPv4 address of the Web server 107 by the response 818, it establishes connection 819 using the IPv4 communication protocol, and acquires data from the Web server 107.

Other Embodiments

The present invention has been explained based on its preferred embodiment. However, the present invention is not limited to the above embodiment, and various modifications may be made within the scope of the appended claims. For example, in the above embodiment, the name server module 304 of the DNS server 109 notifies the resolver module 302 of the client 106 of the address which is received by the resolver module 307 from the external DNS server 107 before the communication protocol check module 308 checks if that address is active. By contrast, in another embodiment, the name server module 304 of the DNS server 109 notifies the resolver module 302 of the client 106 of the address received by the resolver module 307 from the external DNS server 107 after the communication protocol check module 308 checks if that address is active.

In this embodiment, if the name-lookup query to the external server has succeeded, the resolver module notifies the name server module 304 of the end of the name-lookup query after the address active/inactive status check process of the communication protocol check module 308 is completed. The name server module 304 returns a response to the resolver module 302 on the basis of the address active/inactive status check result of the communication protocol check module 308 (407, 408). That is, the name server module 304 returns the address (409, 411) if that address is active; or the module 304 returns an acquisition failure (410) if that address is not active.

In this embodiment, the address which is determined as an inactive address by the communication protocol check module 308 may be deleted from the cache data 306. In such embodiment that deletes the inactive address, the R-TTL field 705 and check field 706 may be omitted.

In still another embodiment, in place of checking the active/inactive status of the addresses in the cache data 306 at predetermined intervals in step 601 in FIG. 8, the name server module 304 checks the active/inactive status of an address registered in the cache data 306 every time it receives a query about that address, and returns a response corresponding to the check result.

Furthermore, in this embodiment, the active/inactive status check process is executed at predetermined intervals in addition to that to be executed upon reception of a query from the client.

In a modification, the active/inactive status check process at predetermined intervals is executed for the address which is determined as an inactive address in the previous check process. In this way, an increase in network traffic can be avoided.

In yet another embodiment, it is checked if each of the addresses registered in the cache data 306 is an IPv6 or IPv4 address. If the registered address is an IPv6 address, its active/inactive status is checked at predetermined intervals; if it is an IPv4 address, the active/inactive status check process at predetermined intervals is skipped (or the active/inactive status is checked at an interval longer than that for the IPv6 address). In this way, an increase in network traffic due to the active/inactive status check process of IPv4 addresses that rarely cause connection failures can be avoided.

In the above embodiment, the Web client 106 and Web server 107 are not limited to Web applications, but may be any other network applications.

In the above embodiment, the DNS server 109 connected to the user network 101 need not always hold the zone master file 305 used to manage the domain of a host terminal group that belongs to the user network 101, and may provide only a function as a simple DNS cache server.

In the above embodiment, the domain management network 102 and server network 103 need not always be independent networks, but the DNS server 108 and Web server 107 may be present on a single network.

In the above embodiment, the DNS server 109 need not always belong to the user network 101, but its location need only be close to the user network as much as possible. For example, the DNS server 109 may be present in a network in an ISP that provides the Internet service to the client 106.

In the above embodiment, the domain names, FQDNs, IPv4 network addresses, IPv4 addresses, IPv6 network addresses, and IPv6 addresses assigned to respective holds are merely examples, and other arbitrary domain names, FQDNs, IPv4 network addresses, IPv4 addresses, IPv6 network addresses, and IPv6 addresses may be used.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code itself installed in the computer also implements the present invention. In other words, the claims of the present invention also cover a computer program for the purpose of implementing the functions of the present invention.

In this case, so long as the system or apparatus has the functions of the program, the program may be executed in any form, e.g., as object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

Further, it is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Furthermore, besides the case where the aforesaid functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

What is claimed is:

1. An address notification method comprising, upon receiving a query about an address of a first apparatus from a second apparatus, sending a query about the address of the first apparatus to a third apparatus;

conducting a connection test with the first apparatus using the address of the first apparatus obtained from the third apparatus; and notifying the second apparatus of the address of the first apparatus obtained from the third apparatus, wherein before a result of the connection test has been obtained, the second apparatus is notified of, as an expiration time of the address of the first apparatus, a second expiration time shorter than the first expiration time of the address of the first apparatus that is obtained from the third apparatus together with the address of the first apparatus, and wherein after an affirmative result of the connection test has been obtained, the second apparatus is notified of, as an expiration time of the address of the first apparatus, a third expiration time based on the first expiration time of the address of the first apparatus that is obtained from the third apparatus together with the address of the first apparatus.

2. The address notification method according to claim 1, wherein, a connection test with the first apparatus is conducted using a protocol corresponding to the address of the first apparatus.

3. A computer readable storage medium embodying a computer program, wherein the computer program comprising, upon receiving a query about an address of a first apparatus from a second apparatus, sending a query about the address of the first apparatus to a third apparatus;

conducting a connection test with the first apparatus using the address of the first apparatus obtained from the third apparatus; and notifying the second apparatus of the address of the first apparatus obtained from the third apparatus, wherein before a result of the connection test has been obtained, the second apparatus is notified of, as an expiration time of the address of the first apparatus, a second expiration time shorter than the first expiration time of the address of the first apparatus that is obtained from the third apparatus together with the address of the first apparatus, and wherein after an affirmative result of the connection test has been obtained, the second apparatus is notified of, as an expiration time of the address of the first apparatus, a third expiration time based on the first expiration time of the address of the first apparatus that is obtained from the third apparatus together with the address of the first apparatus.

4. The computer readable storage medium embodying a computer program according to claim 3 wherein a connection test with the first apparatus is conducted using a protocol corresponding to the address of the first apparatus.

5. An address notification apparatus comprising:

connecting means for connecting a network; and notifying means for notifying a second apparatus of an address of a first apparatus upon reception of a query about the address of the first apparatus from the second apparatus via the network connected by the connecting means, wherein the notifying means sends a query about the address of the first apparatus to a third apparatus, and before a result of the connection test has been obtained notifies the second apparatus of, as an expiration time of the address of the first apparatus, a second expiration time shorter than the first expiration time of the address of the first apparatus that is obtained from the third apparatus together with the address of the first apparatus, and wherein after an affirmative result of the connection test has been obtained, the second apparatus is notified of, as an expiration time of the address of the first apparatus, a third expiration time based on the first expiration time of the address of the first apparatus that is obtained from the third apparatus together with the address of the first apparatus.

6. The address notification apparatus according to claim 5, wherein the notifying means conducts a connection test with the first apparatus using a protocol corresponding to the address of the first apparatus.

* * * * *